UNITED STATES PATENT OFFICE.

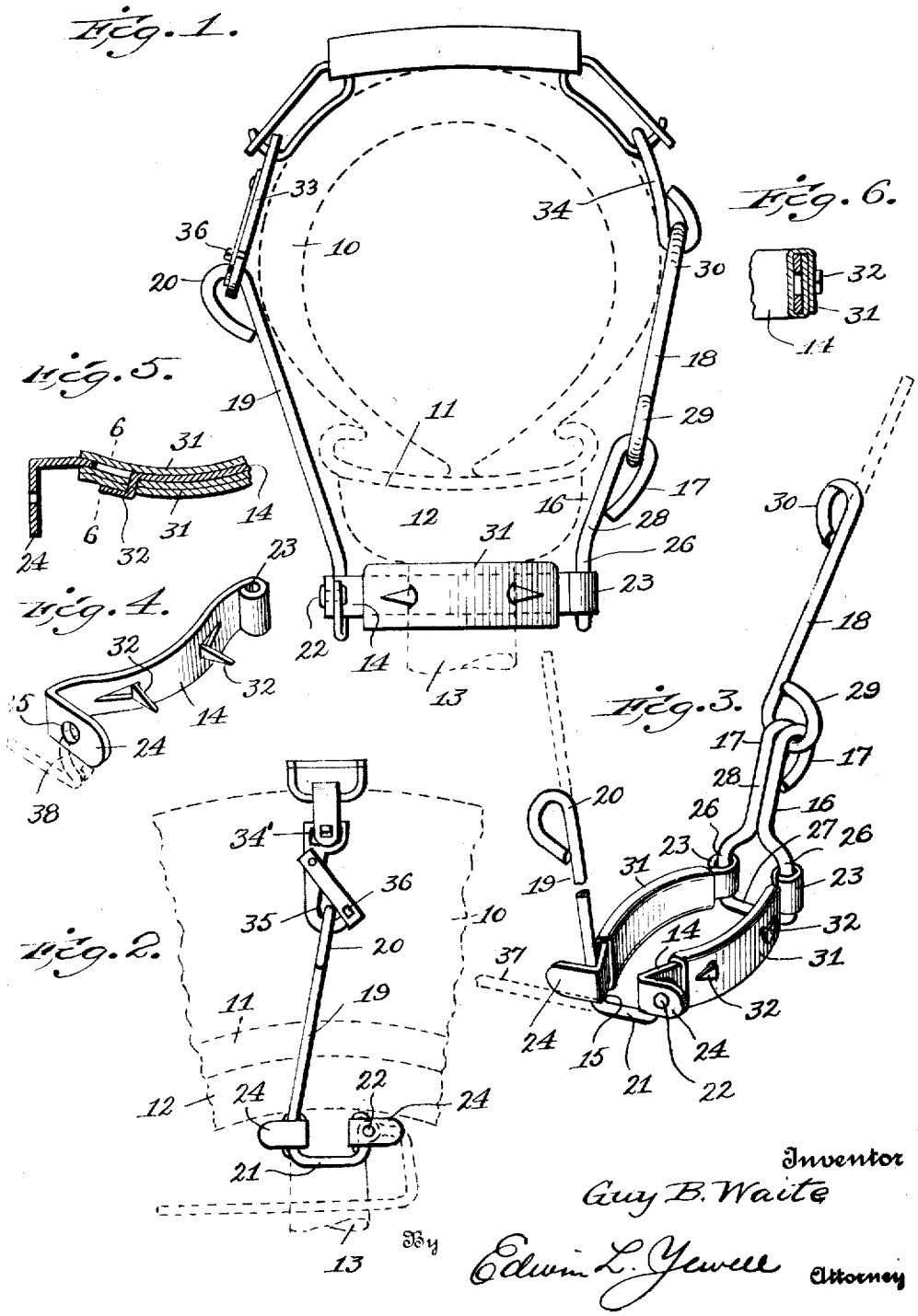

GUY B. WAITE, OF NEW YORK, N. Y.

ATTACHMENT DEVICE FOR ANTISKID MEANS.

1,329,484.  Specification of Letters Patent.  Patented Feb. 3, 1920.

Application filed January 7, 1918. Serial No. 210,702.

*To all whom it may concern:*

Be it known that I, GUY B. WAITE, citizen of the United States, residing at New York, in the county of New York and State of New York, have invented certain new and useful Improvements in Attachment Devices for Antiskid Means, of which the following is a specification.

This invention relates to improvements in attachment devices for tire anti-skid means, and has for its particular object, to provide a means of attachment for anti-skid devices which is simple and strong, and at the same time, easy to connect to a wheel.

A further object is to provide a means for securing an anti-skid device to the spoke of a wheel, and in a manner to retain the same centrally on a tire, and at the same time permit a certain amount of free movements of the several parts relative to each other.

A still further object, is to provide a clamping attachment constructed to engage around a spoke and having a locking means which is retained in locking position by its engagement with the anti-skid means.

These and other objects hereinafter set forth are attained by the means illustrated in the accompanying drawing, in which:—

Figure 1, is a view in elevation of the device in operating position, a transverse section of the tire and a portion of the wheel being shown in dotted lines.

Fig. 2, is another view of the device in elevation looking at the side of the tire and wheel, the latter being shown in dotted lines.

Fig. 3, is a detail perspective view of the attaching means, showing the same in clamping position.

Fig. 4, is a detail perspective view of one of the clamping arms.

Fig. 5, is a longitudinal section through one end of the clamping arm, and

Fig. 6, is a transverse section on the line 6—6 of Fig. 5.

Similar reference numerals in all of the figures of the drawing designate like parts.

Referring to the drawing, 10 designates the tire, 11 the rim, 12 the felly, and, 13 one of the spokes of a wheel.

The anti-skid attachment device embodies the spoke clamping arms 14 and 15, which are separately pivoted at one end to a supporting link 16, and said supporting link is preferably formed with closed loops 17 at its outer end and to which is connected an extension link 18, adapted to be connected at its outer end to one side of the anti-skid device. The opposite side of the anti-skid device is connected to the clamping arms 14 and 15 by a locking link 19, the same being provided at its outer end with a closed loop 20, by which it is secured or attached to the anti-skid means, and is formed at its inner end with a cross-bar 21 that is adapted to span between the free ends of the clamping arms and whose extreme end is pivoted to one of said clamping arms as indicated at 22.

Each of said clamping-arms is preferably formed of flat metal and is provided with a closed loop 23 at one end and is bent angularly at its other end to form an outwardly projecting ear 24, the ear on arm 14 being provided with a perforation 25, which forms the pivot opening for the end of the locking link 19. Closed loops 23 are preferably formed by coiling the ends of the clamping arms back upon themselves, so as to provide elongated bearings, and the same are preferably pivoted upon spaced side-bars 26 of the supporting-link 16. Said clamping arms 14 and 15 are also curved slightly and are positioned to dispose their concave faces opposite each other, whereby they will curve around a spoke 13 and position their ends in relative close relation.

Supporting-link 16 is preferably formed of heavy gage wire, and is bent intermediate its ends to form a closed loop having the spaced side-bars 26 connected at one end by the cross-bar 27 and having their opposite ends bent inwardly toward each other until they contact. The ends are then extended in parallel relation to form the double shank 28, the upper ends of which are bent backwardly to form the loops 17. Extension link 18 can be of any desired shape, but is preferably formed with a single strand of heavy gage wire having its ends bent backwardly to form the closed loops 29 and 30.

Locking link 19 is also preferably formed of heavy gage wire and is bent at one end to form a U-shaped loop, one extremity of which is flattened to receive the pivot 22. As shown, the locking link is pivoted to the rear side of one of the ears 24, so that, when said link is thrown to locking position its cross-bar 21 will lie parallel with the edges of the clamping arms, and its long arm will engage back of the other ear 24 and also against the outer side of the clamping arm. Thus the short arm being pivoted to one of the clamping arms, the long arm will serve as a lever to perform the clamping action around the spoke.

To protect the spokes from injury, a pad 31 is provided for each of the clamping arms. Said pads are formed by wrapping any suitable material around the arms and securing them in place with spurs 32 which are punched from the body of the arms. Preferably the spurs are punched outwardly from the arms, so that they will lie on the outside of the arms and pads, thereby presenting a smooth surface on the inner side of the arms.

This improved attaching means can be used with various types of anti-skid means, but in the present instance, it is shown in connection with an anti-skid means shown, described and claimed in an application for patent having a Serial Number 207,789. This particular anti-skid means embodies a tread block which is adapted to extend transversely of a tire and which is provided with certain shaped connecting links at each end, the end links being hook links, similar to those shown in the present drawing at 33 and 34, and it is to these hook-links that the outer ends of the locking-link 19 and extension link 18 are connected. It will be observed, that when the locking-link 21 is thrown to locking position and its free end is connected with the hook-link 33, that it is retained in its locking position by its connection with the anti-skid means. In other words it cannot be turned backward on its pivot, or be thrown to unlocking position, until its free end is disconnected from the anti-skid means.

To facilitate the connecting operation between the locking link 19 and the anti-skid means, the particularly constructed hook-link 33 has been provided. This link is preferably formed of flat metal and is formed with a closed loop 34' at one end and an open hook 35 at its opposite end, the terminal of said hook being bent to form an upstanding lug 36 with which is adapted to engage the free end of a pivoted spring latch-plate, which has an opening to engage over the lug 36. To unlock this hook link, it is necessary to bend the spring-plate upwardly to disengage the lug 36, and then turn it on its pivot in a direction away from the hook, where it will remain until manually operated in the opposite direction. It thus provides a hook fastener having a spring closing tongue, which does not have to be held open by the operator while he is connecting the locking link thereto. This is an important feature, as it has been found that considerable trouble has been caused by using other types of spring snap fasteners.

To adapt this improved attachment means to tires of various sizes or to different types of anti-skid means, the locking-link 19 and the extension link 18 are usually placed upon the market straight, or without the upper loops 20 and 30, as indicated in dotted lines in Fig. 3 of the drawing. In this condition, the loops 20 and 30 can be formed at any point intermediate the length of these members 18 and 19, thereby making said members either long or short as the size of the tire or the type of anti-skid means demands.

The diameters of spokes also vary, and to adapt the attachment to different sizes, arms 14 and 15 can be made slightly resilient, so that one width of U-loop on the locking-link can be used, but preferably the clamping arms are rigid, and in that case, the locking links are placed upon the market straight, without the U-loop and the closed loop 20, as indicated in dotted lines at 37 in Fig. 3 of the drawing, so that both the U-loop and loop 20 can be formed after the size of the spoke is ascertained. Or the device can be placed upon the market with U-loops of different widths, to enable the buyer to select the size desired.

It will also be understood, that supporting link 16 can be made long enough to engage directly with the hook-link 34, thereby obviating the use of the extension link 18, but to secure a greater flexibility, and for folding, it is preferable to use the extension link 18.

Locking-link 19 can be formed with a loop 38 to serve as a pivot joint, as indicated by dotted lines in Fig. 4, in place of providing a pivot stud as shown in the other figures of the drawings.

From the above description, it will be seen that the device is strong, simple in construction and cheap to manufacture, and will securely retain the anti-skid means in its proper position on the tire, and without injury to the wheel. Furthermore, it is adapted for various adjustments, so that it can be formed to fit spokes and tires of different sizes and also different types of anti-skid means.

While it is preferable to use a locking-link 19 made of heavy wire, as shown in the drawing, it will be understood, that a small link chain can be secured to one of the clamping arms and be pulled around the other arm behind its ear 24, to operate the clamping arms to clamping position.

This attachment after being secured to an anti-skid means to properly fit a certain diameter of tire, forms a unit which can be easily attached or detached from the wheel, even should the operator be wearing gloves. In other words, the act of throwing the locking-link around in a position to be connected to the free side of the anti-skid means, causes the locking link to operate the clamping arms into tight engagement with the spoke of the wheel.

Having thus fully described the invention, what is claimed is:—

1. An attachment device of the class described, comprising a supporting-link, a pair of clamping arms pivoted to said supporting-link and constructed to be permanently and positively supported only at right-angles thereto, and a locking means connected to the free end of one of said clamping arms and movable to locking position in a direction at right angles to the plane of said clamping arms and constructed to engage the free end of the other clamping arm to force the arms to clamping position.

2. An attachment of the class described, comprising a supporting link formed with a closed loop at one end and having spaced parallel side-bars, a clamping arm pivoted to each of said side-bars and positively supported at right-angles thereto, and a locking means connected to one of said clamping arms and constructed to engage the free ends of both of said clamping arms and force them to clamping position.

3. An attachment device of the class described, comprising a supporting link, a pair of clamping arms pivoted to said link and constructed to be permanently and positively supported only at right-angles thereto, and a locking link pivoted to one of said clamping arms and embodying a lever arm formed to engage the free end of the opposite clamping arm to force the arms to clamping position, said locking link being movable to locking position in a direction at right-angles to the plane of the clamping arms.

4. An attachment device of the class described, comprising a supporting link having one end constructed to be connected to one side of an anti-skid means, a pair of clamping arms secured to said supporting link and constructed to be permanently and positively supported only at right-angles thereto, and a locking means connected to one of said clamping arms and formed to engage the free end of the other clamping arm to force the arms to clamping position, and also being provided with means at its free end for connecting it with the other side of the anti-skid means to retain said locking means in locking position.

5. An attachment device of the class described, comprising a supporting link, a pair of clamping arms each having one end pivoted to said supporting link and positively supported at right-angles thereto and provided with outwardly projecting ears at their opposite ends, and a locking link constructed to engage the free ends of both of said clamping arms to the rear of said ears force said clamping arms to clamping position.

6. An attachment device of the class described, comprising a supporting link, a pair of clamping arms each having one end pivoted to said supporting link and positively supported at right-angles thereto, and a locking link having one end pivoted to the free end of one of said clamping arms and formed with a U-shaped loop at its pivot end to provide a cross-bar to lie beneath the clamping arms, and an integral lever-arm formed to force the clamping arms to clamping position when the lever arm is thrown to locking position.

In testimony whereof I affix my signature.

GUY B. WAITE.